United States Patent [19]

Tame

[11] Patent Number: 5,765,840
[45] Date of Patent: Jun. 16, 1998

[54] ELECTRICALLY RELEASED SIX-WAY SEAT ADJUSTMENT

[75] Inventor: Omar D. Tame, W. Bloomfield, Mich.

[73] Assignee: Atoma International Inc., Newmarket, Canada

[21] Appl. No.: 605,267

[22] Filed: Jan. 19, 1996

[51] Int. Cl.[6] ................................................ A47C 1/02
[52] U.S. Cl. ........................ 297/330; 74/625; 248/419
[58] Field of Search .................... 297/330, 311, 297/313, 327, 344.1, 344.11, 344.12, 344.13, 344.17, 362.11; 74/625; 248/419, 420, 422

[56] References Cited

U.S. PATENT DOCUMENTS

| | | |
|---|---|---|
| 4,733,845 | 3/1988 | Maiwald . |
| 5,207,480 | 5/1993 | Johnson et al. ............. 297/344.1 |
| 5,348,373 | 9/1994 | Stiennon ...................... 297/344.1 |
| 5,440,837 | 8/1995 | Piltingsrud ...................... 74/625 X |
| 5,483,853 | 1/1996 | Moradell et al. ............. 297/330 X |
| 5,501,422 | 3/1996 | Chinomi ........................ 248/419 |

Primary Examiner—Laurie K. Cranmer
Attorney, Agent, or Firm—Cushman Darby & Cushman IP Group of Pillsbury Madison & Sutro LLP

[57] ABSTRACT

A vehicle seat having an adjusting mechanism including a locking and releasing device constructed and arranged to be moved between (1) a locking position wherein the locking and releasing device is operable to lock the adjusting mechanism to prevent adjusting movement and (2) a releasing position wherein the locking and releasing device is operable to release the adjusting mechanism to permit manual movement in one direction and return movement in the opposite direction. The adjusting mechanism includes a power operated assembly constructed and arranged to enable the locking and releasing device to be moved between the locking and releasing positions thereof, and a manually actuated remote control constructed and arranged to operate the power operated assembly to enable the locking and releasing device to be selectively moved between the locking and releasing positions thereof.

12 Claims, 6 Drawing Sheets

ELECTRICALLY RELEASED SIX-WAY SEAT ADJUSTMENT

This invention relates to vehicle seats and more particularly to improvements for various manual seat adjustments.

Vehicle seats are often provided with one or more manual adjusting mechanisms. For example, in commonly assigned U.S. patent application Ser. No. 08/341,322, there is disclosed a mounting assembly constructed and arranged to mount a seat cushion assembly on a vehicle floor which includes a six-way adjusting mechanism constructed and arranged to enable the operator to adjust the seat cushion assembly and the seat back cushion assembly mounted thereon in three pairs of opposed movements. The first pair of opposed movements are fore and aft horizontal movements through a range of adjusted positions. In the second, the forward portion of the seat is moved up and down vertically through a range of adjusted positions. In the final pair, the rearward portion of the seat is moved up and down vertically through a range of adjusted positions. The horizontal adjusting mechanism includes a locking and releasing device providing a U-shaped actuating lever located below the forward portion of the seat which is spring biased into a locked position wherein the fore and aft adjusting mechanism retains the seat against fore and aft movement. When the operator moves the lever against its spring bias from its locking position into a releasing position, the seat can then be moved fore or aft into the adjusted position within the range provided which is desired. In the embodiment shown, the movement of the seat, both in the forward direction as well as the rearward direction, is accomplished manually with the actuating lever being also manually retained in its releasing position. As soon as the desired adjusted position is reached, the actuating lever is manually released to be spring returned into its locked position.

The vertical adjusting mechanism includes a locking and releasing device providing a single manually actuated lever. The lever is spring biased into a central position wherein both the front portion of the seat and the rear portion of the seat are retained by the adjusting mechanism against vertical movement.

When the operator manually moves the actuating lever forwardly into a forward releasing position, the forward portion of the seat is released to be moved up or down. The upward movement is accomplished manually by the seat occupant leaning back on the seat back cushion assembly while manually retaining the actuating lever forwardly against its spring bias in its forward releasing position enabling the front portion of the seat cushion to be pivoted upwardly. The downward movement is accomplished manually by the seat occupant leaning forwardly while manually retaining the lever forwardly against its spring bias in its forward releasing position so that the forward portion of the seat cushion can be pivoted downwardly. After the manual positioning has been accomplished, the operator manually releases the lever to allow it to be returned to its locked position by its spring bias.

When the operator manually moves the actuating lever rearwardly against its spring bias from its locking position into a rearward releasing position, the rearward portion of the seat can be moved up and down. The upward movement is accomplished by spring force by the operator leaning forward to control the extent of the spring biased movement which is allowed to take place while manually retaining the actuating lever rearwardly against its spring bias in its rearward releasing position. The lowering movement is accomplished manually by the seat occupant leaning back on the seat back cushion assembly and pivoting the rearward portion of the seat downwardly against its spring bias while manually retaining the actuating lever rearwardly against its spring bias in its rearward releasing position.

The necessity to coordinate a particular hand movement on the actuating lever against a spring bias with a body movement which may be in an opposite direction presents the casual occupant of the seat with a complication in effecting the adjustment which it would be desirable to eliminate.

The complication is easily eliminated by making the adjusting mechanism a power operated mechanism rather than one which requires a manual movement into the adjusted position desired. With a power operated adjusting mechanism, the operator need only push a button or actuate an electric switch to turn on the power. The interengagement of the power actuator with the adjustment mechanism is such that, whenever the power actuator is not turned on, the adjusting mechanism prevents movement of the seat so that there is no need to lock and release the adjusting mechanism by a separate locking and releasing mechanism since this function is built in. The elimination of the need for complicated manual movements is accomplished by a power operated adjusting mechanism but not without adding substantial cost as compared with a manually operated mechanism. The biggest cost factor is the addition of a sufficiently powerful power actuator to effect the movements required. There still exists a need to simplify the manual movements required to effect adjustment in a more cost effective manner without adding the costs of a power actuator capable of making the adjusting movements themselves.

It is an object of the present invention to fulfill the need expressed above. In accordance with the principles of the present invention, this objective is achieved by providing a vehicle seat comprising a seat cushion assembly constructed and arranged to support an occupant seated thereon. A seat back cushion assembly is provided which is constructed and arranged to support the back of an occupant seated on the seat cushion assembly. A first mounting assembly is provided which is constructed and arranged to mount the seat cushion assembly on a vehicle floor assembly. A second mounting assembly is provided which is constructed and arranged to mount the seat back cushion assembly on the seat cushion assembly. An adjusting mechanism is operatively embodied in the first mounting assembly constructed and arranged to enable (1) a forward portion of the seat cushion assembly to be moved generally vertically in opposite directions through a range of adjusted positions with respect to the vehicle floor assembly and (2) a rearward portion of the seat cushion assembly to be moved generally vertically in opposite directions through a range of adjusted positions with respect to the vehicle floor assembly. The adjusting mechanism includes a locking and releasing device constructed and arranged to be moved between (1) a locking position wherein the locking and releasing device is operable to lock the adjusting mechanism to prevent generally vertical movement of the forward and rearward portions of the seat cushion assembly in either direction, (2) a first releasing position wherein the locking and releasing device is operable to release the adjusting mechanism to permit the forward portion of the seat cushion assembly to be manually moved generally vertically in one direction and returned in the opposite direction while the rearward portion of the seat cushion assembly is locked against generally vertical movement in either direction, and (3) a second releasing position wherein the locking and releasing device is operable to release the adjusting mechanism to permit the rearward portion of the seat cushion assembly to be manually moved generally vertically in one direction and returned in the opposite direction while the forward portion of the seat cushion assembly is locked against generally vertical movement in either direction. The adjusting mechanism also includes a power operated assembly constructed and arranged to enable the locking and releasing device to be moved between the locking and the first and second releasing positions thereof, and a manually actuated remote control constructed and arranged to operate the power operated assembly to enable the locking and releasing device to be selectively moved between the locking and the first and second releasing positions thereof.

As indicated above, the present invention is particularly advantageous in a vehicle seat having the fore and aft vertical adjustments described above. However, the principles of the present invention have applicability with regard to any manual seat adjustment even though the coordinated manual movements required to effect adjustment are of less complexity than the fore and aft vertical adjustments mentioned above. Adjustments of this type include the aforesaid fore and aft horizontal adjustment of the type disclosed in the '322 application as well as seat back cushion assembly tilting and dumping adjustments with respect to the seat cushion assembly of the seat such as disclosed in copending U.S. patent application Ser. No. 08/377,007.

Accordingly, it is a further object of the present invention to provide a vehicle seat with at least one adjustment of the type described. In accordance with the principles of the present invention, this objective is achieved by providing a vehicle seat comprising a seat cushion assembly constructed and arranged to support an occupant seated thereon. A seat back cushion assembly is provided which is constructed and arranged to support the back of an occupant seated on the seat cushion assembly. A first mounting assembly is provided which is constructed and arranged to mount the seat cushion assembly on a vehicle floor assembly. A second mounting assembly is provided which is constructed and arranged to mount the seat back cushion assembly on the seat cushion assembly. An adjusting mechanism is operatively embodied in one of the first and second mounting assemblies constructed and arranged to enable the cushion assembly mounted by the one mounting assembly to be moved in opposite directions through a range of adjusted positions with respect to the assembly on which the mounting assembly mounts the cushion assembly. The adjusting mechanism includes a locking and releasing device constructed and arranged to be moved between (1) a locking position wherein the locking and releasing device is operable to lock the adjusting mechanism to prevent movement in either direction of the cushion assembly enabled to be moved thereby and (2) a releasing position wherein the locking and releasing device is operable to release the adjusting mechanism to permit the cushion assembly enabled to be moved thereby to be manually moved in one direction and returned in the opposite direction. The adjusting mechanism also includes a power operated assembly constructed and arranged to enable the locking and releasing device to be moved between the locking and releasing positions thereof. A manually actuated remote control is provided which is constructed and arranged to operate the power operated assembly to enable the locking and releasing device to be selectively moved between the locking and releasing positions thereof.

It is also contemplated that a vehicle seat constructed in accordance with the principles of the present invention can embody a multiplicity of adjustments of the type described.

These and other objects of the present invention will become more apparent during the course of the following detailed description and appended claims.

The invention may best be understood with reference to the accompanying drawings wherein an illustrative embodiment is shown.

Figure 1:
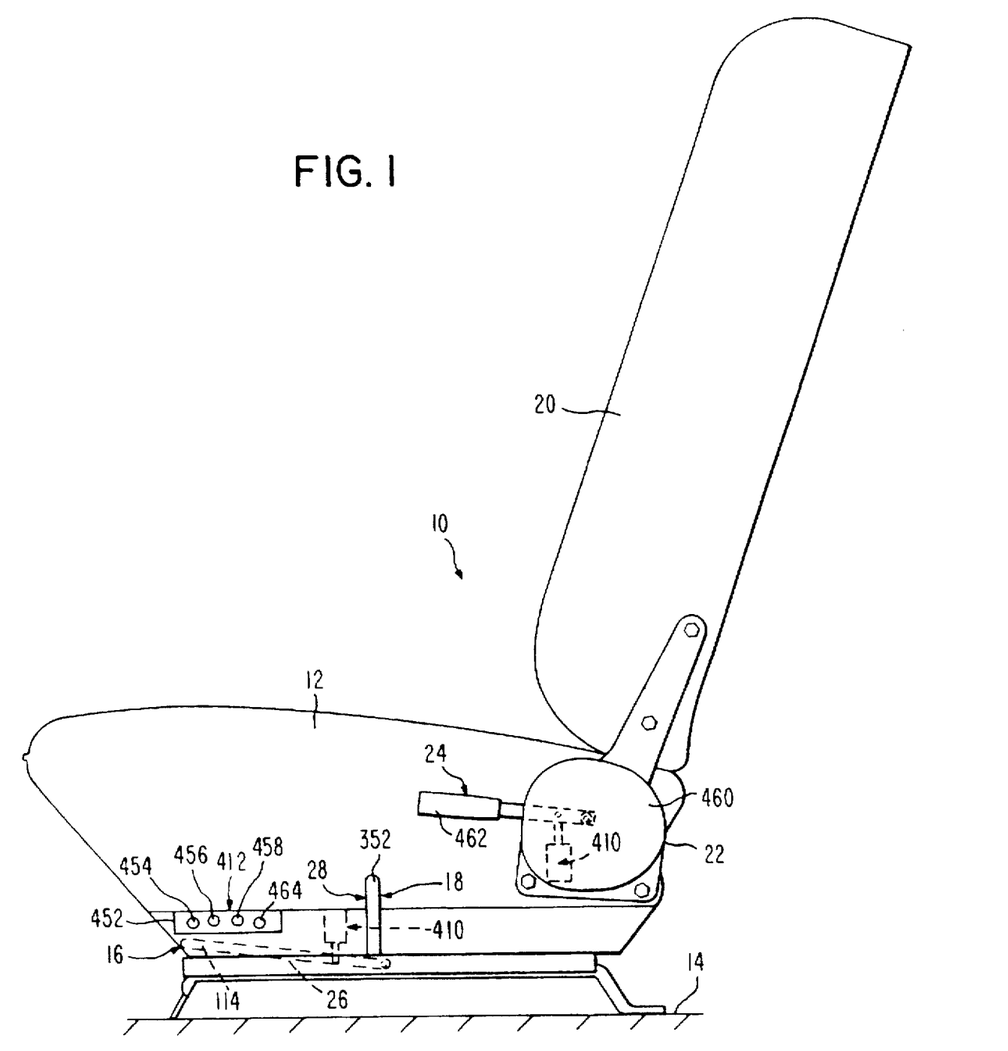
FIG. 1 is a side elevational view of a vehicle seat embodying the principles of the present invention.

Referring now more particularly to the drawings, there is shown in FIG. 1 a vehicle seat 10 which embodies the principles of the present invention. The vehicle seat 10 includes a seat cushion assembly, generally indicated at 12, which can embody any conventional construction and includes the usual frame, cushioning and cover. The seat cushion assembly 12 is mounted on a vehicle floor assembly 14 by a mounting assembly, generally indicated at 16. The mounting assembly 16 embodies therein a six-way manual adjusting mechanism, generally indicated at 18, which, as shown, is based on the disclosure of the six-way manual adjusting mechanism contained in the aforesaid copending application Ser. No. 08/341,222, but modified in accordance with the principles of the present invention. The seat 10 also includes a seat back cushion assembly 20 which likewise may be of any conventional construction including the usual frame, cushioning and cover. The seat back cushion assembly 20 is mounted on the seat cushion assembly 12 by a second mounting assembly, generally indicated at 22. The mounting assembly 22 is shown somewhat schematically in FIG. 1 and includes an adjusting mechanism, generally indicated at 24.

Figure 9:
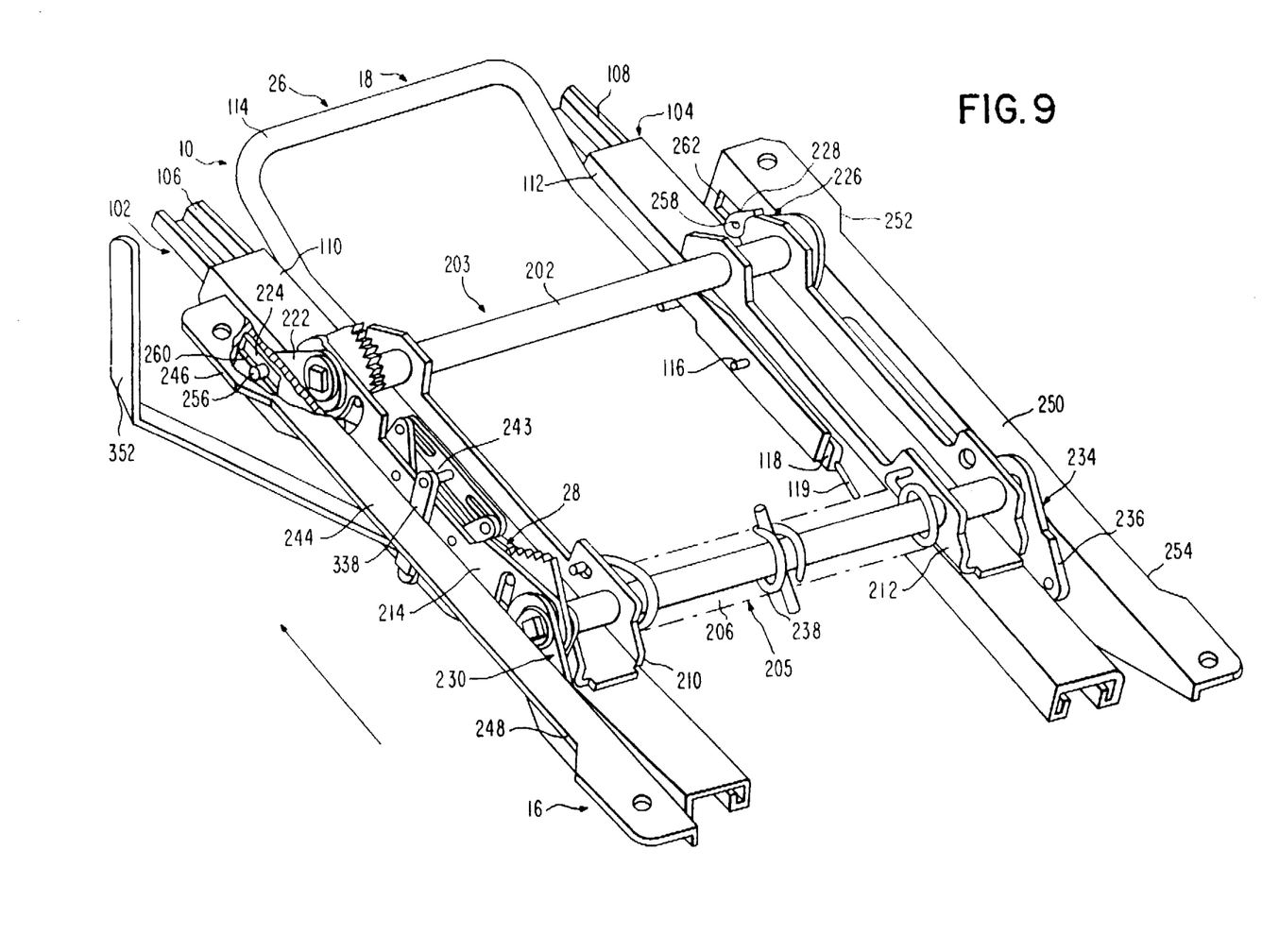
FIG. 9 is a perspective view of the mounting assembly disclosed in copending application Ser. No. 08/341,222 prior to the modification thereof in accordance with the principles of the present invention.

In the broadest aspects of the present invention, the mounting assembly 16 can be based upon any conventional mounting assembly of the prior art which includes a manual adjusting mechanism. However, a preferred mounting assembly in this regard is the mounting assembly disclosed in the aforesaid '222 copending application which embodies therein a six-way manual adjusting mechanism. FIG. 9 illustrates the construction of the '222 copending application prior to the modification thereof in accordance with the principles of the present invention.

As shown in FIG. 9, the mounting assembly 16 includes a six-way manual adjusting mechanism 18 which includes a fore and aft horizontal adjusting mechanism, generally indicated at 26, and a front and rear vertical adjusting mechanism, generally indicated at 28. The horizontal adjusting mechanism 26 includes left and right track assemblies 102 and 104. The track assemblies 102 and 104 include elongated stationary tracks 106 and 108, respectively, that are fixedly mounted on the vehicle floor 14, and elongated translating tracks 110 and 112, respectively, that are slidably interconnected with the stationary tracks 106 and 108. The horizontal adjusting mechanism 26 is provided to allow an occupant of the seat to selectively position the translating tracks 110 and 112 and hence the cushion assemblies 12 and 20 of the seat 10 in any one adjusted position within a range of horizontal positions relative to the stationary tracks 106 and 108.

The horizontal adjusting mechanism 26 includes a locking and releasing device 118 embodying an actuating member in the form of a U-shaped bail 114, the legs of which are pivotally mounted by pins 116 to the translating tracks 110 and 112, respectively. The actuating member is normally spring biased into a locking position by biasing spring member 119 as shown in FIG. 9. The bight portion of the U-shaped bail 114 is positioned below the forward end of the seat cushion assembly 12 so that a seat occupant can selectively disengage the locking and releasing device 118 by lifting the adjusting bail 114. With the locking and releasing device 118 disengaged, the translating tracks 110 and 112 are slidable relative to the stationary tracks 106 and 108 and the occupant of the seat may manually position the seat 10, which is fixed to the translating tracks 110 and 112, in a selected one of a multiplicity of different horizontal positions in a fore and aft, direction. Upon release of the adjusting bail 114, biasing spring members 119 within the locking and releasing device 118 will urge the locking and releasing device 118 back into a locked position. The details of construction of the locking and releasing device may include any known prior art constructions such as that disclosed in U.S. Pat. No. 4,733,845. A preferred embodiment is disclosed in copending commonly assigned application Ser. No. 08/527,727. In the embodiment described, both fore and aft movements are accomplished manually by the operator or seat occupant. It is within the contemplation of the present invention that the seat could be moved by springs in one direction under the control of the operator and manually moved in the other against the spring bias provided.

The vertical adjusting mechanism 28 aspect of the mounting assembly 16 includes forward and rearward seat support arm assemblies 203 and 205, each including a forward torsion rod 202 and a rearward torsion rod 206, respectively. As shown in FIG. 9, mounted on opposite ends of the forward torsion rod 202 are left and right forward seat support arms 222 and 226, respectively. The forward seat support arms 222 and 226 are fixedly mounted to the forward torsion rod 202 so as to be rotatable along with the forward rod 202, the left forward seat support arm 222 being a slave of the right forward seat support arm 226, and vice versa.

Mounted on opposite ends of the rearward torsion rod 206 are left and right rearward seat support arms 230 and 234, respectively. The rearward seat support arms 230 and 234 are fixedly mounted to the rearward torsion rod 206 so as to be rotatable with the rearward rod 206, the left rearward seat is support arm 230 being a slave of the right rearward seat support arm 234, and vice versa. In addition, as shown in FIG. 9, the rearward torsion rod is operatively coupled with a spring biasing system 238 which urges the rearward torsion rod 206 to rotate in such a manner as to rotate the rearward seat support arms 230 and 234 into an upward position.

Left and right seat cushion mounting members 244 and 250 are provided for securing the vehicle seat 10 to the six-way seat adjustment assembly 18. The end portions 224 and 228 of the left and right forward seat support arms 222 and 226, respectively, are pivotally coupled with the forward portions 246 and 252 of the left and right seat cushion mounting members 244 and 250, respectively. The forward seat support arms 222 and 226 are coupled with the seat cushion mounting members 244 and 250 by means of pins 256 and 258, respectively, extending from the forward pivoting seat support arms 222 and 226 and into longitudinal slots 260 and 262 (see FIG. 9) in the forward portions 246 and 252 of the seat cushion mounting members 244 and 250, thus effecting a lost motion coupling. Also, the end portions 236 of the left and right rearward seat support arms 230 and 234 are pivotally attached to the rearward portions 248 and 254 of the left and right seat cushion mounting member 244 and 250 respectively. The seat 10, including the seat cushion assembly 12 and the seat back cushion assembly 20 carried thereby, is mounted to the seat cushion mounting members 244 and 250 by any suitable means such as bolts or rivets.

A mounting structure is provided, which includes left and right rod mounting members 210 and 212 and component mounting structure 214. The torsion rods 202 and 206 and a component mounting structure 214. The torsion rods 202 and 206 are journally supported in a parallel arrangement by the left and right rod mounting members 210 and 212. Furthermore, the left and right rod mounting members support the forward and rearward seat support arm assemblies 203 and 205 and the seat assemblies 12 and 20 supported thereon on the translating tracks 110 and 112 to allow the seat assemblies 12 and 20 and the translating tracks to be positioned horizontally relative to the stationary tracks 106 and 108. The seat support arm assemblies are fixed to the translating tracks by any suitable means, such as bolts, rivets, welds, or the like. In this manner, the vehicle seat assemblies 12 and 20 are secured to the vehicle floor 14.

As shown in FIGS. 2–4 and 9, the vertical adjusting mechanism allows the occupant of the seat to independently position either the forward or rearward seat support assemblies 203 and 205 into a selected one of a multiplicity of vertical positions and then retain the seat support assembly thereat.

The vertical adjusting mechanism 28 includes the component mounting structure 214 that is arranged adjacent to and parallel with one of the track assemblies. The component mounting structure 214 is shown in FIG. 9 positioned adjacent to and parallel with the left track assembly 102; however, it will be clear to one skilled in the art that the component mounting structure may be fixed alongside the right track assembly 104 as well. The component mounting structure 214 is constructed of an inner component mounting structure plate 216 and an outer component mounting structure plate 218, disposed in substantially parallel arrangement and defining a space 220 therebetween.

Figure 2:
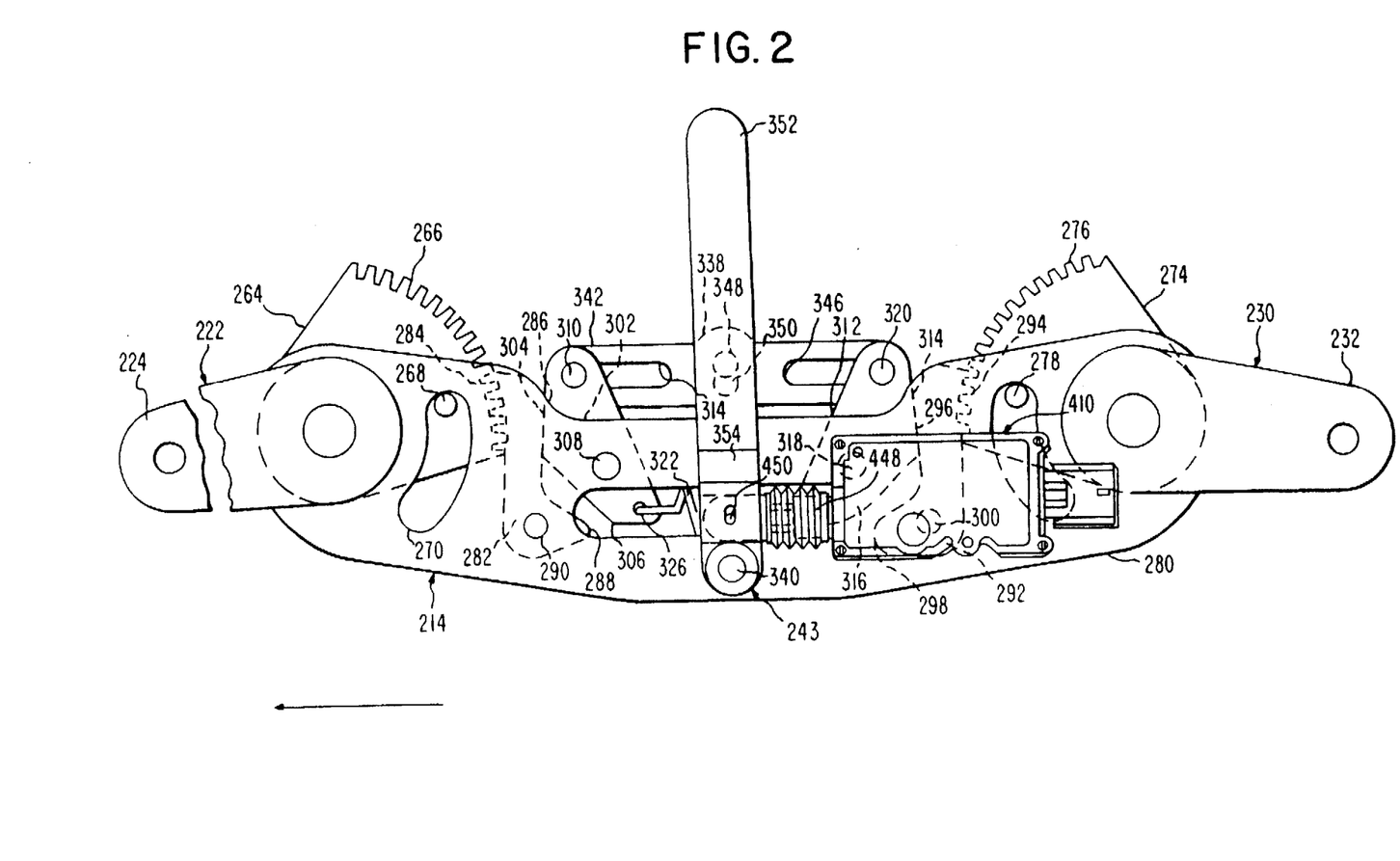
FIG. 2 side elevational view of the vertical adjust mechanism embodied in the seat of FIG. 1, showing the actuating lever in a locking position.
Figure 3:
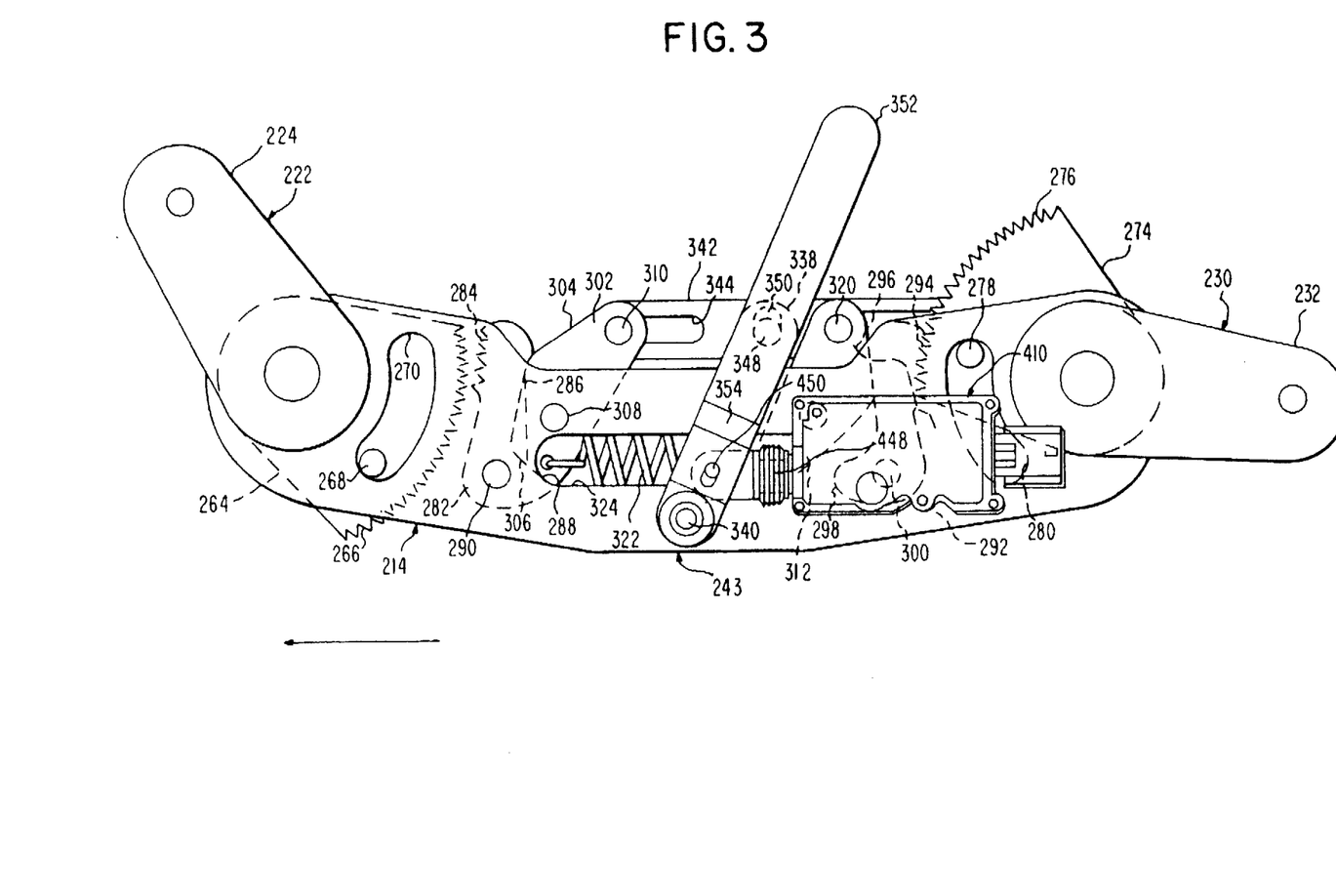
FIG. 3 is a view similar to FIG. 2 showing the actuating lever in a rearward releasing position.
Figure 4:
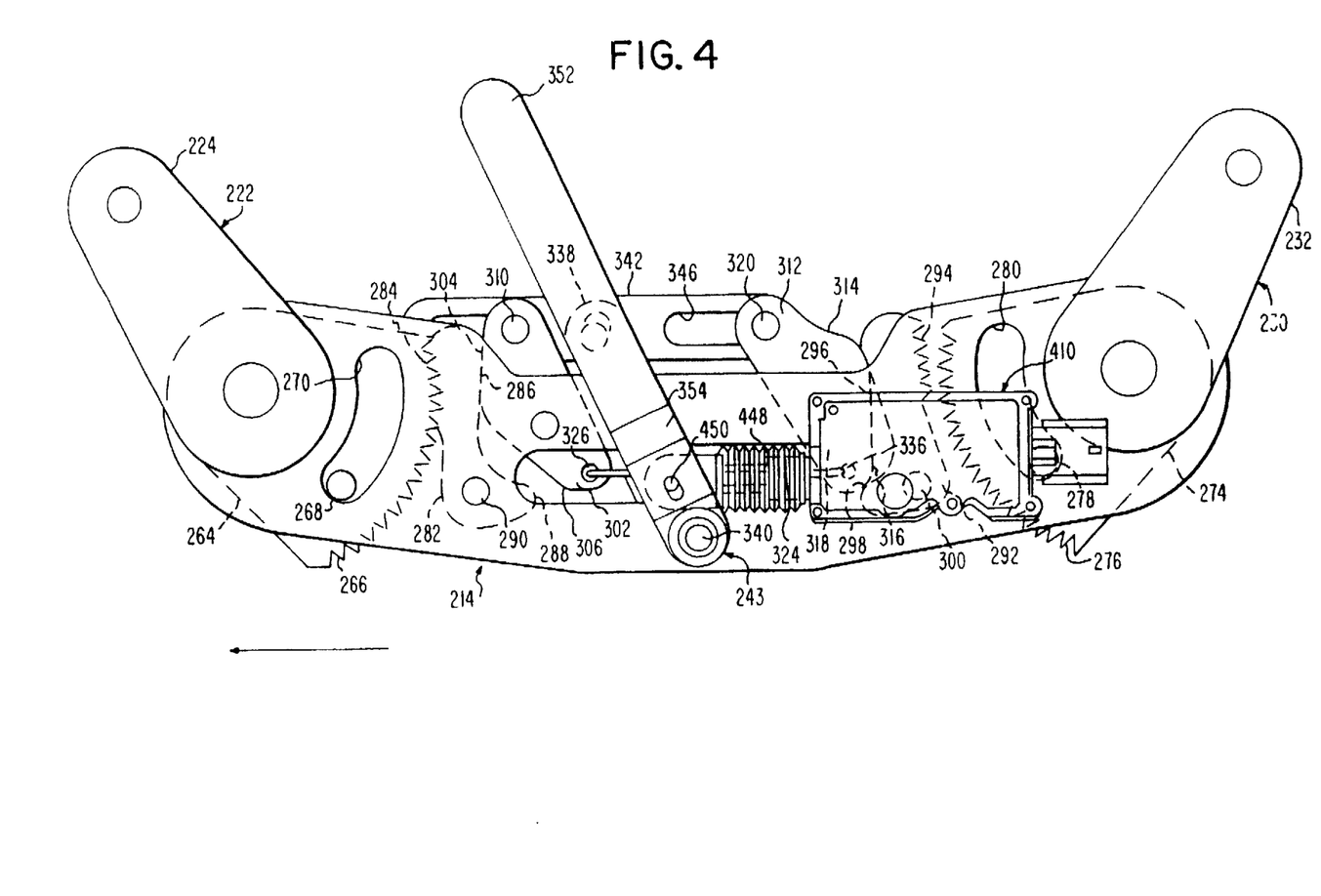
FIG. 4 a view similar to FIG. 2 showing the actuating lever in a forward releasing position.

As best shown in FIGS. 2–4, the vertical adjusting mechanism 28 includes a locking and releasing device, generally indicated at 263, constructed and arranged to be moved between (1) a locking position wherein the locking and releasing device 263 is operable to lock the vertical adjusting mechanism 28 to prevent generally vertical movement of the forward and rearward portions of the seat cushion assembly 12 in either direction, (2) a first releasing position wherein the locking and releasing device 263 is operable to release the vertical adjusting mechanism 28 to permit the forward portion of the seat cushion assembly 12 to be manually moved generally vertically in one direction and returned in the opposite direction while the rearward portion of the seat cushion assembly 12 is locked against generally vertical movement in either direction, and (3) a second releasing position wherein the locking and releasing device 263 is operable to release the vertical adjusting mechanism 28 to permit the rearward portion of the seat cushion assembly 12 to be manually moved generally vertically in one direction and returned in the opposite direction while the forward portion of the seat cushion assembly 12 is locked against generally vertical movement in either direction.

The locking and releasing device 263 includes a forward sector gear 264 having locking projections 266 along a curved portion thereof is mounted on the forward torsion rod 202 in the space 220 between the inner and outer component mounting structure plates 216, 218. The forward sector gear 264 is fixedly mounted to the forward torsion rod 202 so as to be rotatable with the rod and is oriented in such a manner that the locking projections 266 generally face rearwardly. The range of rotational motion of the forward sector gear 264, and thus of the forward torsion rod 202, is preferably restricted by means of a restraining pin 268 extending from the forward sector gear 264 and into a forward arcuate slot 270 located in the component mounting structure 214.

In a mirror construction of the forward sector gear 264, a rearward sector gear 274 having locking projections 276 along a curved portion thereof is mounted on the rearward torsion rod 206 in the space 220 between the inner and outer component mounting structure plates 216 and 218. The rearward sector gear 274 is fixedly mounted to the rearward torsion rod 206 so as to be rotatable with the rod and is oriented in such a manner that the locking projections 276 generally face forwardly. The range of rotational motion of the rearward sector gear 274, and thus of the rearward torsion rod 206, is preferably restricted by means of a restraining pin 278 extending from the rearward sector gear 274 and into a rearward arcuate slot 280 located in the component mounting structure 214.

At a position toward the center of the component mounting structure 214 from the forward sector gear 264, a forward locking member 282 (see FIGS. 2-4) having locking teeth 284, an engaging surface 286, and a disengaging surface 288 is pivotally mounted on a pin 290 in the space 220 between the inner and outer component mounting structure plates 216 and 218. The forward locking member 282 is pivotable between (1) an engaged position, shown in FIGS. 2 and 4, wherein the locking teeth 284 are engaged with the locking projections 266 of the forward sector gear 264 thereby preventing rotation of the forward sector gear, the forward seat support arm assembly, and the forward portion of the seat cushion assembly, and (2) a disengaged position, shown in FIG. 3, wherein the locking teeth 284 are disengaged from the locking projections 266 of the forward sector gear 264, thereby releasing the forward sector gear 264, the forward seat support arm assembly 203, and the forward portion of the seat cushion assembly for vertical positioning of the forward portion of the seat cushion assembly.

In a mirror construction of the forward locking member 282, at a position toward the center of the component mounting structure 214 from the rearward sector gear 274, a rearward locking member 292 having locking teeth 294, an engaging surface 296, and a disengaging surface 298 is pivotally mounted on a pin 300 in the space 220 between the inner and outer component mounting structure plates 216 and 218. The rearward locking member 292 is pivotable between (2) an engaged position, shown in FIGS. 2 and 3, wherein the locking teeth 294 are engaged with the locking projections 276 of the rearward sector gear 274 thereby preventing rotation of the rearward sector gear, the rearward seat support arm assembly, and the rearward portion of the seat cushion assembly, and (2) a disengaged position, shown in FIG. 4, wherein the locking teeth 294 are disengaged from the locking projections 276 of the rearward sector gear 274, thereby releasing the rearward sector gear 274, the rearward seat support arm assembly 205, and the rearward portion of the seat cushion assembly for vertical positioning of the rearward portion of the seat cushion assembly.

At a position toward the center of the component mounting structure 214 from the forward locking member 282, a forward camming member 302 having a locking surface 304 and a camming surface 306 is pivotally mounted on a pin 308 in the space 220 between the inner and outer component mounting structure plates 216 and 218. The forward camming member 302 is mounted for pivotal movement between (1) a locked position, shown in FIGS. 2 and 4, wherein the locking surface 304 is engaged with the engaging surface 286 of the forward locking member 282 so as to urge the forward locking member into its engaged position, and (2) a released position, shown in FIG. 3, wherein the camming surface 306 is engaged with the disengaging surface 288 of the forward locking member 282 so as to urge the forward locking member into its disengaged position.

In a mirror construction of the forward camming member 302, at a position toward the center of the component mounting structure 214 from the rearward locking member 292, a rearward camming member 312, having a locking surface 314 and a camming surface 316, is pivotally mounted on a pin 318 in the space 220 between the inner and outer component mounting structure plates 216 and 218. The rearward camming member 312 is mounted for pivotal movement between (1) a locked position, shown in FIGS. 2 and 3, wherein the locking surface 314 is engaged with the engaging surface 296 of the rearward locking member 292 so as to urge the rearward locking, member into its engaged position, and (2) a released position, shown in FIG. 4, wherein the camming surface 316 is engaged with the disengaging surface 298 of the rearward locking member 292 so as to urge the rearward locking member into its disengaged position.

The vertical adjustment mechanism 28 is further provided with a resilient coupling 322, such as a tension spring or the like, disposed within a horizontal slot 324 in the component mounting structure 214. Opposite ends of the resilient coupling 322 are attached to lower portions 326 and 336 of the forward and rearward camming members 302 and 312 so that the resilient coupling urges the forward and rearward camming members into their locked positions.

An actuating member 338 is pivotally mounted at 340 to the component mounting structure 214 generally at its center. The lever actuated control member is movable between a centered locking position, see FIG. 2, and either a first releasing position, see FIG. 4, or a second releasing position, see FIG. 3.

As can be seen in FIG. 2, the actuating member 338 defines a line of symmetry about which the geometry of the components mounted to the forward portion of the component mounting structure mirrors the geometry of the components mounted to the rearward portion of the component mounting structure.

A fore and aft motion transmitting member 342 having a forward longitudinal slot 344 and a rearward longitudinal slot 346 is coupled with the actuating member 338 at an end of the actuating member opposite the end at which it is pivotally mounted to the component mounting structure 214. The fore and aft motion transmitting member 342 is coupled with the actuating member 338 preferably by means of a lost motion coupling formed by a pin 348 extending from the lever actuated control member and into a transversely elongated hole 350 located in the fore and aft motion transmitting member 342 between the forward longitudinal slot 344 and the rearward longitudinal slot 346.

A forward camming member sliding pin 310 extending from the forward camming member 302 and into the forward longitudinal slot 344 couples the fore and aft motion transmitting member 342 with the forward camming member 302. Similarly, a rearward camming member sliding pin 320 extending from the rearward camming member 312 and into the rearward longitudinal slot 346 couples the fore and aft motion transmitting member 342 with the rearward camming member 312.

A manually engageable lever 352 is fixedly attached at 354 to the actuating member 338 such that the manually engageable lever 352 forms a portion of the actuating member 338 that pivots about point 340. The manually engageable lever enables an occupant of the seat to manually move the actuating member 338 from the centered locking position into a selected one of the releasing positions.

In accordance with the principles of the present invention, the components of the vertical adjusting mechanism 28 described above has added thereto a power operated assembly, generally indicated at 410, which is constructed and arranged to enable the locking and releasing device 263 to be moved between the locking and the first and second releasing positions thereof. In addition, there is provided a manually operated remote control, generally indicated at 412, which is constructed and arranged to operate the power operated assembly 410 to enable the locking and releasing device 263 to be selectively moved between the locking and the first and second releasing positions thereof.

Figure 5:
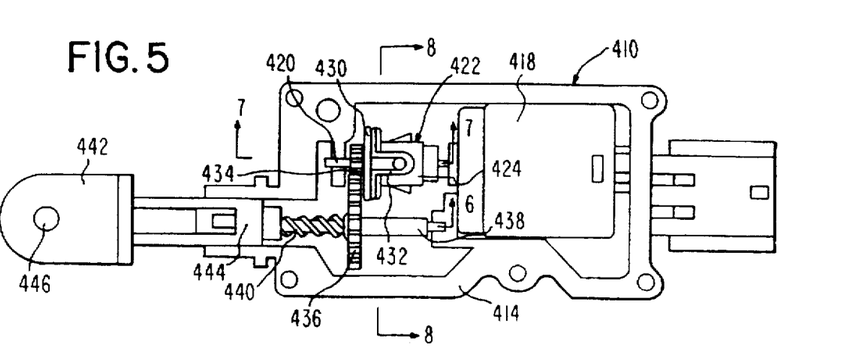
FIG. 5 a plan view of the power operating assembly shown in FIG. 1 with the bellows element removed together with the top part of the housing.
Figure 6:
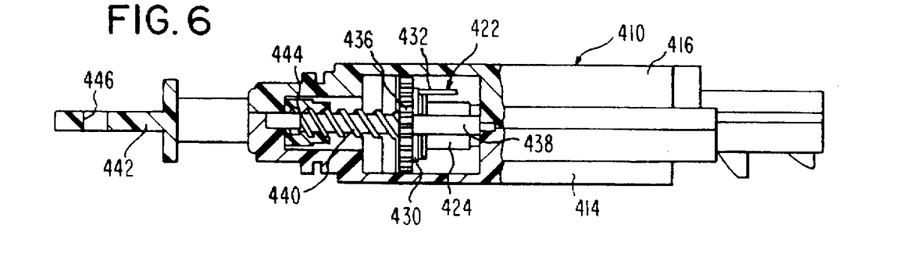
FIG. 6 is a sectional view taken along the line 6—6 of FIG. 5 with the top part of the housing in place.
Figure 7:
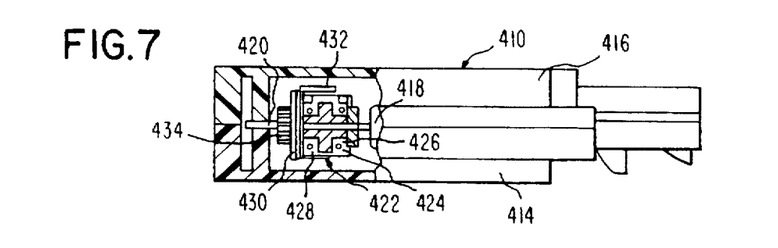
FIG. 7 is a sectional view similar to FIG. 6 taken along the line 7—7 of FIG. 5.
Figure 8:
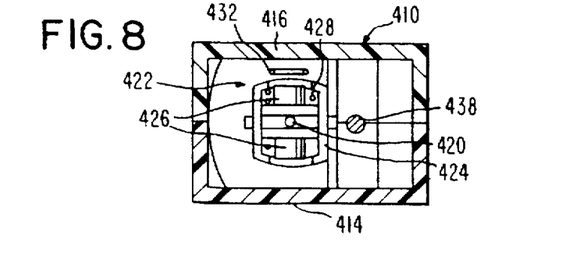
FIG. 8 an enlarged sectional view similar to FIG. 6 taken along the line 8—8 of FIG. 5.

As best shown in FIGS. 5–8, the power operated assembly 410 includes a housing formed by two cooperating housing parts 414 and 416 which are connected together by suitable fasteners. Mounted within the housing parts 414 and 416 is an electric motor 418 having an output shaft 420. As best shown in FIGS. 5–7, mounted on the output shaft 420 is a centrifugal coupler, generally indicated at 422. The centrifugal coupler 422 includes a housing member 424 which is suitably fixed to the output shaft 420. Mounted within the housing members 424 is a pair of weights 426. Each of the weights 426 is in the form of a disk having a central cylindrical projection extending from the center thereof. Each weight 426 is mounted within the housing member 424 to be spring biased, as by a coil spring 428, into a decoupling position within the housing member 424. When the output shaft 420 is rotated, the weights 426 are moved by centrifugal force generally radially outwardly against the bias of springs 428 into a coupling position.

The centrifugal coupler 422 also includes a driven member 430 which is rotatably mounted on the output shaft 420 and has affixed thereto a driving portion 432 in the form of a rod which includes a bent central portion with arcuate ends embracing the driven member 430 in fixed relation. The driving portion 432 is disposed in a position to avoid engagement by the weights 426 when in the decoupling position thereof and to be engaged by either one of the weights 426 when in the coupling position thereof.

Fixed to the driven member 430 is a small spur gear 434 which, in turn, meshes with a large spur gear 436 fixed to a second shaft 438 disposed parallel with the output shaft 420 of the electric motor 418. As best shown in FIGS. 5 and 6, the ends of the second shaft 438 are journalled between the housing parts 414 and 416 and a portion of the second shaft 438 which extends between the large spur gear 436 and the adjacent end thereof is formed with a series of large pitch threads 440 on the exterior periphery thereof. A moving member 442 includes an inner portion 444 which is mounted within the housing parts 414 and 416 for longitudinal translational movement in opposite directions. The inner portion 444 is internally threaded to meshingly engage with the series of large pitch threads on the second shaft 438 so that, when the second shaft 438 is rotated in one direction, the moving member 442 will be moved in one direction and, when the second shaft is rotated in the opposite direction, the moving member 442 will be moved in the opposite direction.

The moving member 442 includes an outer portion which is apertured, as indicated at 446, and, as shown in FIGS. 2, 3 and 4, a flexible bellows shaped boot 448 is mounted on the moving member 442 so as to cover the portion of the moving member 442 which is exterior of the housing parts 414 and 416. The outer end of the moving member 442 is connected to the actuating member by a pin 450 which also extends through aligned slots in an offset end extension of the manually engageable lever 352 and the actuating member 338.

Referring now more particularly to FIG. 1, the manually actuated remote control 412 includes a housing 452 containing a first spring pressed button or switch which is electrically connected with a source of electricity (e.g., the vehicle battery) and with the electric motor 418 in such a way as to cause rotation of the output shaft 420 of the electric motor 418 in one direction when the button 454 is pushed and held manually. The remote control 412 also includes a second spring pressed button or switch 456 which is connected electrically with a source of electricity and the electric motor 418 in such a way as to cause the output shaft 420 to rotate in the opposite direction.

The arrangement is such that, when an operator manually pushes the button 454, the electric motor 418 will be energized to cause the output shaft 420 to rotate in one direction. As soon as the output shaft 420 begins to rotate, the weights 426 will be moved from their spring pressed decoupling position in a generally radially outward direction into their coupling position by centrifugal force. As soon as the weights 426 reach the coupling position, one of the weights 426 will engage the driving portion 432 of the driven member 430 to cause the small spur gear 434 to rotate with the output shaft 420. The meshing of the small spur gear 420 with the large spur gear causes the second shaft 438 to rotate about its axis. The rotation of the second shaft 438 enables threads 440 to move the moving member 442 and the actuating member 338 therewith from a central locking position into a first releasing position as shown in FIG. 3.

In this position, the actuating member 338 is operable to move the locking member 282 out of engagement with the sector 264 thereby allowing the seat occupant to adjust the forward portion of the seat cushion assembly 12 into a desired adjusted position within the range of vertical adjusted positions provided. The movement of the seat 10 is by a manual movement of the seat occupant either leaning forward to move the forward portion of the seat cushion assembly 12 downwardly or leaning backward against the seat back cushion assembly 20 to pivot the forward end of the seat cushion assembly 12 upwardly. During the adjusting movement by the seat occupant, the continued energization of the electric motor 418 is required in order to maintain the actuating member 338 in its first releasing position. As soon as the forward portion of the seat cushion assembly 12 has been moved into its desired adjusted position, the seat occupant releases the button 454 which releases the bias of the electric motor 418 to maintain the centrifugal coupler 422 in its coupling position. As soon as the electric motor 418 is released, the spring bias 428 of the weights 426 will return the weights 426 to their decoupling position, thus decoupling the motion transmitting mechanism between the output shaft 420 and the movable member 446. This allows the actuating member 338 to be returned to its locking position under the bias of spring 322.

When the button 456 is pressed by the operator, the electric motor 418 will be energized to rotate the output shaft 420 in the opposite direction. As soon as the output shaft 420 begins to rotate, the centrifugal coupler 422 will be moved from its decoupling position to its coupling position to drive the small gear 434 which, in turn, rotates the second shaft 438. The meshing threads 440 cause the moving member 442 to be moved forwardly, which, in turn, moves the actuating member 338 into its second releasing position. In this position, the locking member 192 is moved so that its teeth 294 are out of engagement with the teeth 276 of the member 274, thus enabling the rear portion of the seat cushion assembly 12 to be moved upwardly by the spring system 205 under the control of the seat occupant or, alternatively, enabling the operator to move the rear portion of the seat cushion assembly 12 downwardly by leaning against the seat back cushion assembly 20 and causing the rear portion of the seat cushion assembly 12 to pivot downwardly against the action of the spring system 205. Here again, the operator should continue the engagement of the button 456 until the adjustment has been manually effected in order that the energization of the electric motor 418 will maintain the centrifugal coupler 422 in its coupling position. As soon as the button 456 is released, the energization of the electric motor 418 is released allowing the centrifugal coupler 422 to move into its decoupling position and enabling the actuating member 338 to be returned to its locking position by the spring 322.

The remote control 412 is shown in FIG. 1 as being mounted on the side of the seat cushion assembly 12. It will be understood that the remote control 412 can be mounted on the dashboard or on the console unit which is adjacent to the seat 10 or any other desired place which is convenient to the seat occupant.

While the provision of the power operated assembly 410 and cooperating remote control 412 are disclosed above as being particularly useful in conjunction with the dual vertical adjusting mechanism 28 of the '222 application, it will be understood that it is within the contemplation of the present invention to combine the power operated assembly 410 and cooperating remote control 412 with any other known adjusting mechanism as well as other known vertical adjusting mechanisms. Moreover, it is within the contemplation of the present invention to combine the power operated assembly 410 and the cooperating remote control 412 with each adjusting mechanism of a seat containing a number of different adjustments for the entire seat and/or the seat back assembly 20 of the seat. As shown in FIG. 1, the horizontal adjusting mechanism 26 has a second power operated assembly 410, connected between the frame of the seat cushion assembly 12 and the actuating member 114 thereof. A button 458 is embodied in the remote control 412 to enable the seat occupant to release the horizontal adjusting mechanism 26 and move the seat cushion assembly 12 into any desired adjusted position within the range provided.

In addition, a third power operated assembly 410 is provided between a frame structure 460 of the mounting assembly 22 and an actuating member 462 of the adjusting mechanism 24 in the mounting assembly 22. The adjusting mechanism 24 is such that, when the actuating member 462 is moved from the spring biased locking position, shown in FIG. 1, into a releasing position, the seat back cushion assembly 20 can be manually moved about a first axis into any desired adjusted included position within a range of inclined positions provided or it may be moved forwardly about a second axis into a dumped position within a range of dumped positions all of which are essentially the same or nearly the same. As before, in order to provide the operator with the ability to manually actuate the third power operated assembly 410, the remote control 412 includes a button 464 which is electrically connected to energize the electric motor 418 of the power operated assembly 410 as before.

It will be noted that, in every instance, the operation of the power operated assembly 410 is such that the operator has the option of (1) directly manually moving the actuating member provided or (2) manually depress the associated button of the remote control 412 in order to enable a manual adjustment to be accomplished. It will be understood that, while this option is preferable, it is within the contemplation of the present invention to provide remote control operation only.

Any United States patent applications or patents mentioned or cited hereinabove are hereby incorporated by reference into the present specification.

It thus will be seen that the objects of this invention have been fully and effectively accomplished. It will be realized, however, that the foregoing preferred specific embodiments have been shown and described for the purpose of illustrating the functional and structural principles of this invention and is subject to change without departure from such principles. Therefore, this invention includes all modifications encompassed within the spirit and scope of the following claims.

What is claimed is:

1. A vehicle seat comprising
   a seat cushion assembly constructed and arranged to support an occupant seated thereon,
   a seat back cushion assembly constructed and arranged to support the back of an occupant seated on said seat cushion assembly,
   a first mounting assembly constructed and arranged to mount said seat cushion assembly on a vehicle floor assembly,
   a second mounting assembly constructed and arranged to mount said seat back cushion assembly on said seat cushion assembly, and
   an adjusting mechanism operatively embodied in said first mounting assembly constructed and arranged to enable (1) a forward portion of the seat cushion assembly to be moved generally vertically in opposite directions through a range of adjustable positions with respect to the vehicle floor assembly and (2) a rearward portion of the seat cushion assembly to be moved generally vertically in opposite directions through a range of adjustable positions with respect to the vehicle floor assembly,
   said adjusting mechanism including a locking and releasing device constructed and arranged to be moved between (1) a locking position wherein said locking and releasing device is operable to lock said adjusting mechanism to prevent generally vertical movement of the forward and rearward portions of the seat cushion assembly in either direction, (2) a first releasing position wherein the locking and releasing device is operable to release said adjusting mechanism to permit the forward portion of the seat cushion assembly to be manually moved generally vertically in one direction and returned in the opposite direction while the rearward portion of the seat cushion assembly is locked against generally vertical movement in either direction, and (3) a second releasing position wherein the locking and releasing device is operable to release said adjusting mechanism to permit the rearward portion of the seat cushion assembly to be manually moved generally vertically in one direction and returned in the opposite direction while the forward portion of the seat cushion assembly is locked against generally vertical movement in either direction, said adjusting mechanism also including a power operated assembly constructed and arranged to enable said locking and releasing device to be moved between the locking and the first and second releasing positions thereof, and a manually actuated remote control constructed and arranged to operate said power operated assembly to enable said locking and releasing device to be selectively moved between the locking and the first and second releasing positions thereof.

2. A vehicle seat as defined in claim 1 wherein said locking and releasing device includes an actuating member constructed and arranged to be spring biased into a central locking position corresponding with the locking position of said locking and releasing device and to be moved against the spring bias (1) in one direction into a first releasing position corresponding with the first releasing position of said locking and releasing device and (2) in an opposite direction into a second releasing position corresponding to the second releasing position of said locking and releasing device.

3. A vehicle seat as defined in claim 2 wherein said power operated assembly comprises a housing having mounted therein an electric motor constructed and arranged with respect to said manually actuated remote control so that (1) a first selective manual actuation of said remote control connects an electrical source to said electric motor in a first manner and (2) a second selective manual actuation of said remote control connects an electrical source to said electrical motor in a second manner, said electric motor having an output shaft rotatable (1) in one direction in response to the connection of an electrical source with said electric motor in said first manner and (2) in an opposite direction in response to the connection of an electric source with said electric motor in said second manner, a moving member, and a motion transmitting mechanism connected between said output shaft and said moving member constructed and arranged to move said moving member (1) in one direction with respect to said housing in response to the rotation of said output shaft in said one direction and (2) in an opposite direction with respect to said housing in response to the movement of said output shaft in said opposite direction, said power operated assembly being connected between said seat cushion assembly and said actuating member such that a relative movement of said moving member with respect to said housing (1) in said one direction results in the movement of said actuating member from the locking position thereof into the first releasing position thereof and (2) in said opposite direction results in the movement of said actuating member from the locking position thereof into the second releasing position thereof.

4. A vehicle seat as defined in claim 3 wherein said motion transmitting assembly includes a centrifugal coupler constructed and arranged to connect said moving member in motion transmitting relation with said output shaft when said output shaft is rotating and to disconnect said moving member from motion transmitting relation with said output shaft when said output shaft is not rotating so that the actuating member is allowed to return from either its first or second releasing position into its locking position by the spring bias thereof.

5. A vehicle seat as defined in claim 4 wherein said actuating member includes a manually engageable lever portion movable therewith so as to enable said actuating member to be moved from the locking position thereof against its spring bias selectively into either the first or second releasing position thereof by direct movement of said actuating lever portion selectively in said one direction or said opposite direction or by a first selective manual actuation of said remote control or a second selective manual actuation of said remote control.

6. A vehicle seat as defined in claim 4 wherein said centrifugal coupler includes a housing member fixed to said output shaft having a pair of weights mounted therein constructed and arranged to be spring biased into a decoupling position and operable to be moved radially outwardly against the spring bias by centrifugal force into a coupling position during the rotation of said output shaft and a selectively driven member rotatably mounted on said output shaft having a driving portion disposed in a position to avoid engagement by said weights when in the decoupling position thereof and to be engaged by one of said weights when in the coupling position thereof.

7. A vehicle seat as defined in claim 6 wherein said motion transmitting mechanism includes a second shaft rotatably mounted in said housing in parallel relation with the output shaft of said electric motor, a first gear fixed to said selectively driven member and a second gear fixed to said second shaft in meshing relation with said first gear, said second shaft including a portion having large pitch threads thereon, said moving member including an inner portion mounted in said housing for limited longitudinal translational movement in one direction and in an opposite direction, said inner portion having threads mating with the large pitch threads on said second shaft so that rotation of said second shaft (1) in one direction moves said movable member in one direction and (2) in an opposite direction moves said movable member in an opposite direction.

8. A vehicle seat comprising a seat cushion assembly constructed and arranged to support an occupant seated thereon, a seat back cushion assembly constructed and arranged to support the back of an occupant seated on said seat cushion assembly, a first mounting assembly constructed and arranged to mount said seat cushion assembly on a vehicle floor assembly, a second mounting assembly constructed and arranged to mount said seat back cushion assembly on said seat cushion assembly, an adjusting mechanism operatively embodied in one of said first and second mounting assemblies constructed and arranged to enable the cushion assembly mounted by said one mounting assembly to be moved in opposite directions through a range of adjustable positions with respect to the assembly on which the one mounting assembly mounts the cushion assembly, said adjusting mechanism including a locking and releasing device constructed and arranged to be moved between (1) a locking position wherein said locking and releasing device is operable to lock said adjusting mechanism to prevent movement in either direction of the cushion assembly enabled to be moved thereby and (2) a releasing Position wherein the locking and releasing device is operable to release said adjusting mechanism to permit the cushion assembly enabled to be moved thereby to be manually moved in one direction and returned in the opposite direction, said adjusting mechanism also including a power operated assembly constructed and arranged to enable said locking and releasing device to be moved between the locking and releasing positions thereof, a manually actuated remote control constructed and arranged to operate said power operated assembly to enable said locking and releasing device to be selectively moved between the locking and releasing positions thereof, said adjusting mechanism is operatively embodied in said first mounting assembly and is constructed and arranged to enable the seat cushion assembly to be moved generally horizontally in opposite directions through a range of adjustable Positions with respect to the vehicle floor assembly, a second adjusting mechanism operatively embodied in said first mounting assembly constructed and arranged to enable (1) a forward portion of the seat cushion assembly to be moved generally vertically in opposite directions through a range of adjustable positions with respect to the vehicle floor assembly and (2) a rearward portion of the seat cushion assembly to be moved generally vertically in opposite directions through a range of adjustable positions with respect to the vehicle floor assembly, said second adjusting mechanism including a second locking and releasing device constructed and arranged to be moved between (1) a locking position wherein said second locking and releasing device is operable to lock said second adjusting mechanism to prevent generally vertical movement of the forward and rearward portions of the seat cushion assembly in either direction, (2) a first releasing position wherein the second locking and releasing device is operable to release said second adjusting mechanism to permit the forward portion of the seat cushion assembly to be manually moved generally vertically in one direction and returned in the opposite direction while the rearward portion of the seat cushion assembly is locked against generally vertical movement in either direction, and (3) a second releasing position wherein the second locking and releasing device is operable to release said second adjusting mechanism to permit the rearward portion of the seat cushion assembly to be manually moved generally vertically in one direction and returned in the opposite direction while the forward portion of the seat cushion assembly is locked against generally vertical movement in either direction, said second adjusting mechanism also including a second power operated assembly constructed and arranged to enable said second locking and releasing device to be moved between the locking and the first and second releasing positions thereof, said manually actuated remote control being constructed and arranged to operate said second power operated assembly to enable said second locking and releasing device to be selectively moved between the locking and the first and second releasing positions thereof.

9. A vehicle seat as defined in claim 8 including a third adjusting mechanism operatively embodied in said second mounting assembly constructed and arranged to enable the seat back cushion assembly to be moved about a generally horizontal reclining axis in opposite directions through a range of adjustable positions with respect to the seat cushion assembly, said third adjusting mechanism including a third locking and releasing device constructed and arranged to be moved between (1) a locking position wherein said third locking and releasing device is operable to lock said third adjusting mechanism to prevent movement of the seat back cushion assembly about the reclining axis in either direction and (2) a releasing position wherein the third locking and releasing device is operable to release said third adjusting mechanism to permit the seat back cushion assembly to be manually moved about the reclining axis in one direction and returned in the opposite direction, said third adjusting mechanism also including a third power operated assembly constructed and arranged to enable said third locking and releasing device to be moved between the locking and releasing positions thereof, said manually actuated remote control being constructed and arranged to operate said third power operated assembly to enable said third locking and releasing device to be selectively moved between the locking and releasing positions thereof.

10. A vehicle seat comprising a seat cushion assembly constructed and arranged to support an occupant seated thereon, a seat back cushion assembly constructed and arranged to support the back of an occupant seated on said seat cushion assembly, a first mounting assembly constructed and arranged to mount said seat cushion assembly on a vehicle floor assembly, a second mounting assembly constructed and arranged to mount said seat back cushion assembly on said seat cushion assembly, an adjusting mechanism operatively embodied in one of said first and second mounting assemblies constructed and arranged to enable the cushion assembly mounted by said one mounting assembly to be moved in opposite directions through a range of adjustable positions with respect to the assembly on which the one mounting assembly mounts the cushion assembly, said adjusting mechanism including a locking and releasing device constructed and arranged to be moved between (1) a locking position wherein said locking and releasing device is operable to lock said adjusting mechanism to prevent movement in either direction of the cushion assembly enabled to be moved thereby and (2) a releasing position wherein the locking and releasing device is operable to release said adjusting mechanism, to permit the cushion assembly enabled to be moved thereby to be manually moved in one direction and returned in the opposite direction, said adjusting mechanism also including a power operated assembly constructed and arranged to enable said locking and releasing device to be moved between the locking and releasing positions thereof, a manually actuated remote control constructed and arranged to operate said sower operated assembly to enable said locking and releasing device to be selectively moved between the locking and releasing positions thereof, said locking and releasing device includes an actuating member constructed and arranged to be spring biased into a locking position corresponding with the locking position of said locking and releasing device and to be moved against the spring bias in one direction into a releasing position corresponding with the releasing position of said locking and releasing device, said power operated assembly comprises a housing having mounted therein an electric motor constructed and arranged with respect to said manually actuated remote control so that a selective manual actuation of said remote control connects an electrical source to said electric motor, said electric motor having an output shaft rotatable in response to the connection of an electrical source with said electric motor, a moving member, and a motion transmitting mechanism connected between said output shaft and said moving member constructed and arranged to move said moving member with respect to said housing in response to the rotation of said output shaft, said power operated assembly being connected between said one cushion assembly and said actuating member such that a relative movement of said moving member with respect to said housing results in the movement of said actuating member from the locking position thereof into the releasing position thereof, said motion transmitting assembly includes a centrifugal coupler constructed and arranged to connect said moving member in motion transmitting relation with said output shaft when said output shaft is rotating and to disconnect said moving member from motion transmitting relation with said output shaft when said output shaft is not rotating so that the actuating member is allowed to return from its releasing position into its locking position by the spring bias thereof.

11. A vehicle seat as defined in claim 10 wherein said centrifugal coupler includes a housing member fixed to said output shaft having a pair of weights mounted therein constructed and arranged to be spring biased into a decoupling position and operable to be moved radially outwardly against the spring bias by centrifugal force into a coupling position during the rotation of said output shaft and a selectively driven member rotatably mounted on said output shaft having a driving portion disposed in a position to avoid engagement by said weights when in the decoupling position thereof and to be engaged by one of said weights when in the coupling position thereof.

12. A vehicle seat as defined in claim 11 wherein said motion transmitting mechanism includes a second shaft rotatable mounted in said housing in parallel relation with the output shaft of said electric motor, a first gear fixed to said selectively driven member and a second gear fixed to said second shaft in meshing relation with said first gear, said second shaft including a portion having large pitch threads thereon, said moving member including an inner portion mounted in said housing for limited longitudinal translational movement in one direction and in an opposite direction, said inner portion having threads mating with the large pitch threads on said second shaft so that rotation of said second shaft (1) in one direction moves said movable member in one direction and (2) in an opposite direction moves said movable member in an opposite direction.

* * * * *